United States Patent Office.

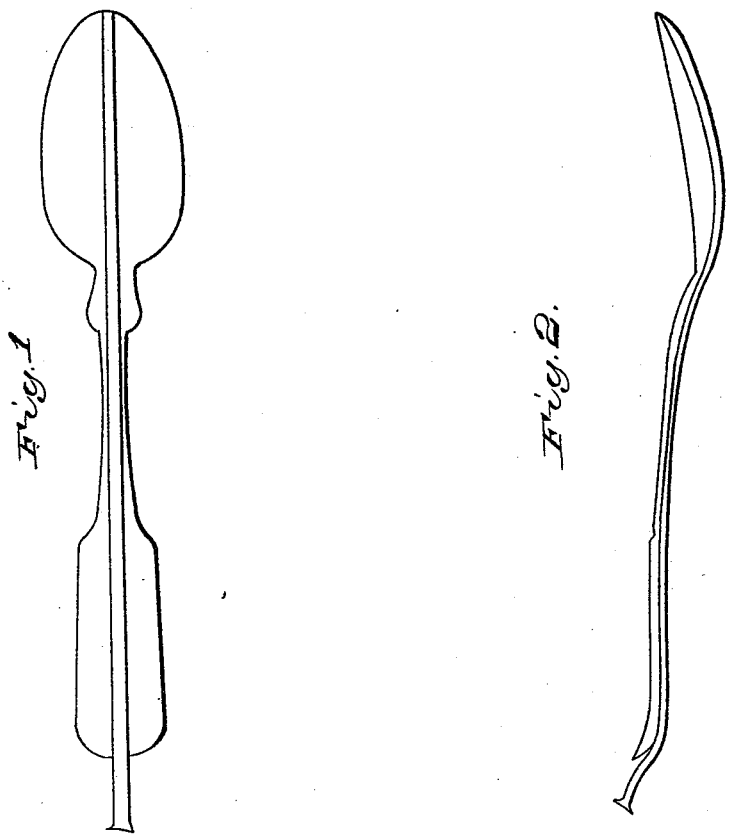

FRANKLIN W. WILLARD, OF NEW YORK, N. Y.

Letters Patent No. 61,591, dated January 29, 1867; antedated January 12, 1867.

---

IMPROVEMENT IN SPOONS.

---

*The Schedule referred to in these Letters Patent and making part of the same.*

---

TO ALL WHOM IT MAY CONCERN:

Be it known that I, FRANKLIN W. WILLARD, of the city, county, and State of New York, have invented a new and useful Improvement in Sucker Spoons, for the purpose of drinking tea, coffee, and other liquors; and I do declare that the following is a full and exact description thereof.

The nature of my invention consists in placing upon the back side of the spoon, and running longitudinally with the bowl and handle, a small tube, with an opening at the lower end near the point of the bowl, likewise an opening at the upper end which projects a little above the handle.

The lower end of the spoon being placed in the cup or glass containing liquor to be drank, the upper end between the lips, it is thus used as a sucker for drinking tea, coffee, or strong drinks in a genteel and polite manner.

Having given a general description of my invention, I will now give a description in detail, references being had to the figures and drawings annexed.

Figure 2 is a side of the spoon, showing the sucker or small tube *a*.

Figure 1 is a rear view of the same.

Having given a description of my invention, what I claim now, and desire to secure by Letters Patent, is—

A tubular handle to the spoon, for the use and purposes substantially set forth in specification.

FRANKLIN W. WILLARD.

Witnesses:
 FRANK F. WILLARD,
 ISAAC CLARK.